US012501987B2

(12) United States Patent
Hornfeck

(10) Patent No.: US 12,501,987 B2
(45) Date of Patent: Dec. 23, 2025

(54) COSMETIC APPLICATOR OR COMPONENT THEREOF WITH SPECIAL THREAD SPINDLE DRIVE

(71) Applicant: A. W. Faber-Castell Cosmetics GmbH, Stein (DE)

(72) Inventor: Stefan Hornfeck, Geroldsgrün (DE)

(73) Assignee: A. W. Faber-Castell Cosmetics GmbH, Stein (DE)

( * ) Notice: Subject to any disclaimer, the term of this patent is extended or adjusted under 35 U.S.C. 154(b) by 0 days.

(21) Appl. No.: 18/605,439

(22) Filed: Mar. 14, 2024

(65) Prior Publication Data

US 2024/0306795 A1 Sep. 19, 2024

(30) Foreign Application Priority Data

Mar. 15, 2023 (DE) ........................ 202023101287.6

(51) Int. Cl.
*A45D 40/20* (2006.01)
*B43K 21/08* (2006.01)

(52) U.S. Cl.
CPC ...... *A45D 40/205* (2013.01); *A45D 2040/208* (2013.01); *B43K 21/085* (2013.01)

(58) Field of Classification Search
CPC ........ A45D 40/04; A45D 40/06; B43K 21/08; B43K 21/085; B65D 83/764
See application file for complete search history.

(56) References Cited

U.S. PATENT DOCUMENTS 1,414,752 A * 5/1922 Salz ........................ B43K 21/08 401/86
1,734,784 A * 11/1929 Vierling ............... B43K 21/085 401/75
2,222,415 A * 11/1940 Landwehr .............. A45D 40/06 401/78
2,395,535 A * 2/1946 Crane .................... A45D 40/04 401/79
4,136,980 A * 1/1979 Leem ..................... B43K 21/08 401/75
4,755,075 A * 7/1988 Leem ................... B43K 21/085 401/86
5,553,956 A * 9/1996 Mitsuya ................. B43K 21/08 401/75
10,974,539 B2 * 4/2021 Kanari ................... B43K 24/00
2017/0245620 A1 8/2017 Kim

* cited by examiner

*Primary Examiner* — David P Angwin
*Assistant Examiner* — Bradley S Oliver

(57) ABSTRACT

A cosmetic applicator or assembly part for a cosmetic applicator, includes a thread spindle drive for moving a cosmetic mass lead relative to a lead housing tube accommodating the lead, wherein a thread is formed on an inner peripheral surface of the lead housing tube, and the thread interacts with a complementary thread of a lead holder, and the thread moves the lead holder together with the lead relative to the lead housing tube translationally when the lead holder is rotated, wherein said thread of the lead housing tube is not a continuous thread, but consists of a plurality of thread islands that are spaced apart from each other, each of the plurality of thread islands having thread projections extending by less than 121° in a circumferential direction and being shaped and arranged such that an outer thread of the lead holder always engages with at least one thread island.

9 Claims, 1 Drawing Sheet

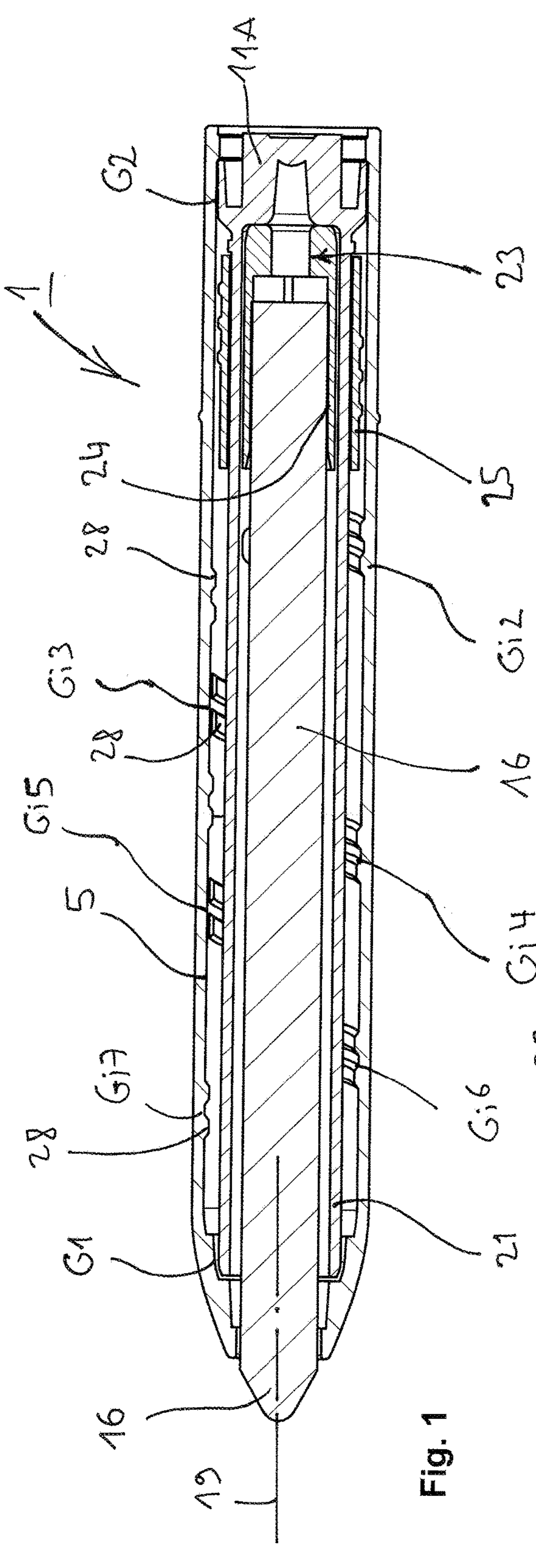
Fig. 1
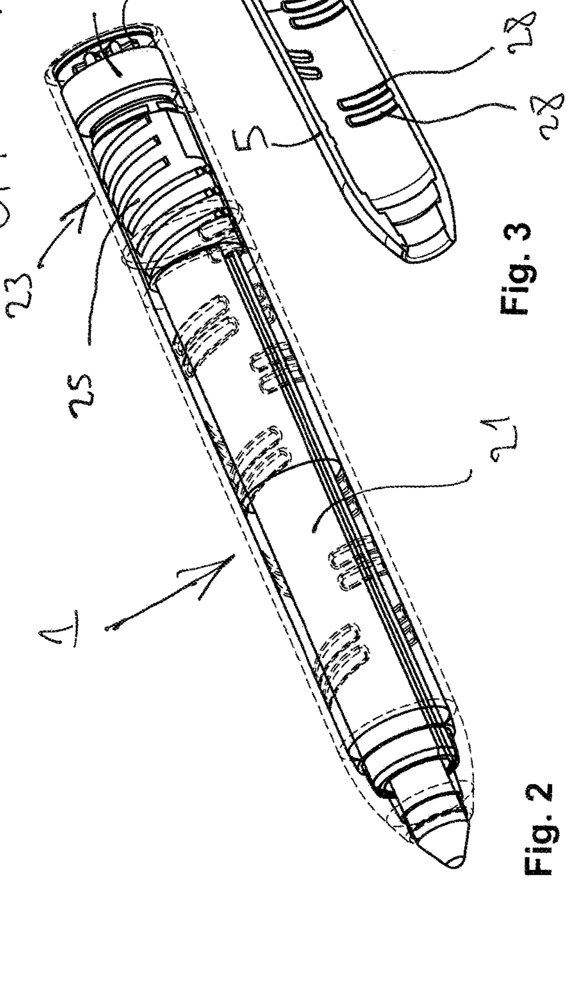
Fig. 2
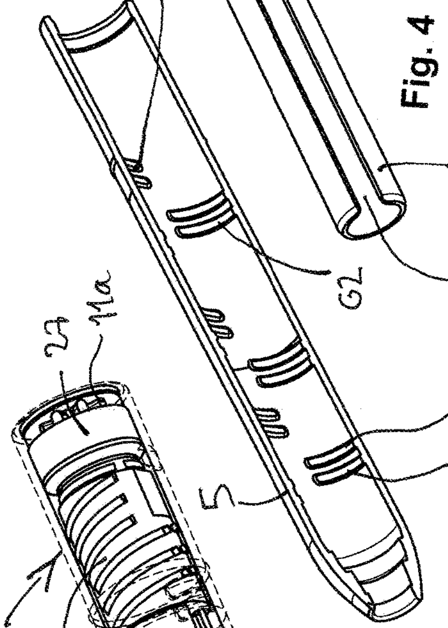
Fig. 3
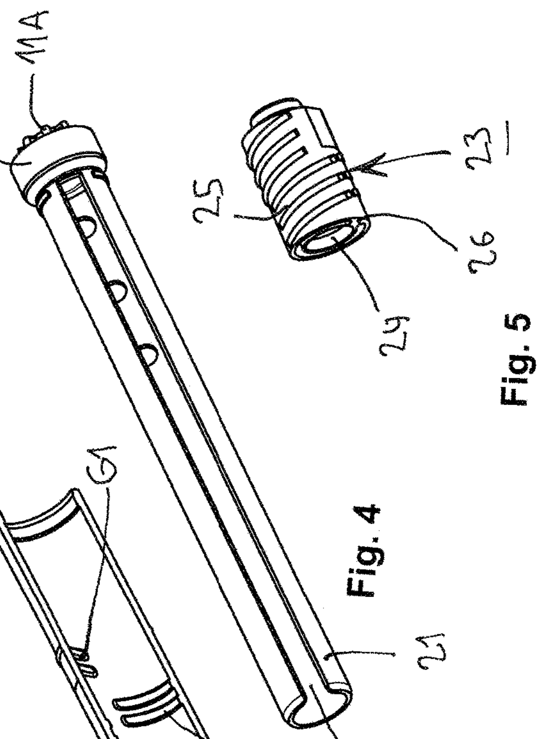
Fig. 4
Fig. 5

COSMETIC APPLICATOR OR COMPONENT THEREOF WITH SPECIAL THREAD SPINDLE DRIVE

FIELD OF THE INVENTION

The invention relates to a cosmetic applicator or a component thereof, such as a cartridge, with a thread spindle drive and a characteristic equipment.

BACKGROUND OF THE INVENTION

Not least, eyeliners are produced like pencils, as one would know them from traditional art pencils. Traditional eyeliners are constructed like wooden colored pencils and need to be sharpened regularly with a sharpener. This results in a lot of material being lost.

As a result, increasingly, eyeliners are being used that have a mechanism allowing the lead to be pushed out of the surrounding and supporting shell of the pencil as far as currently needed. Then, if necessary, only the lead needs to be sharpened to enable it to draw a line of the desired thickness in the front area. This way, maintaining the usability of the eyeliner is accompanied by significantly less material loss.

However, a problem arises in that the lead of an eyeliner or similar pencils must be pushed out of the shell of the pencil over a relatively long distance throughout the product's lifespan.

When a thread is used on the inner circumferential surface of the sleeve to generate the sliding movement, this has so far caused some manufacturing effort. For example, whenever the sleeve is injection-molded, it is necessary to unscrew the sleeve from the injection mold after the injection molding material has solidified, because the thread on the inner surface of the sleeve prevents a linear ejection movement. Such a complex molding process prevents short cycle times and also incurs equipment costs, thus increasing overall expenses.

OBJECT OF THE INVENTION

Against this background, the task of the invention is to provide a cosmetic applicator or a component thereof, such as a refillable cartridge, which has a feeding mechanism that operates over a long distance with a thread, but can be more easily formed after the actual injection molding process than the previous endless thread, which needs to be unscrewed.

SUMMARY OF THE INVENTION

The solution according to the invention consists of a cosmetic applicator or a component thereof, such as a cartridge, for a cosmetic applicator.

Accordingly, a cosmetic applicator or a component thereof, such as a cartridge or a refill cartridge, is proposed for a cosmetic applicator, which has the characteristics mentioned below. Hereinafter, the term "cosmetic applicator" will be used as a representative term for both the cosmetic applicator and the component thereof.

The cosmetic applicator according to the invention comprises a thread spindle drive for displacing a lead consisting of cosmetic material relative to a lead casing tube that wholly or partially accommodates the lead. The lead casing tube may be the outermost tube that the user directly grips with their hands when using the applicator. Alternatively, but not preferably, the lead casing tube may also be an inner tube, for example, still overlapped or enveloped by a cartridge casing that serves a certain design and decorative function.

A thread is formed on the inner circumferential surface of the lead casing tube. It interacts with the complementary thread of a lead holder that holds the lead indirectly or directly. The interaction of the threads causes the lead holder, along with its lead, to be translationally displaced relative to the lead casing tube. This occurs whenever the lead holder is rotated relative to the lead casing tube.

According to the invention, it is now provided that the said thread of the lead casing tube is not a continuous thread. It is also not a thread whose thread grooves or thread flanks continuously extend from beginning to end of the thread and are embedded in the surface of the lead casing tube.

Instead, a number of locally formed thread islands are provided, each of which is spaced apart from each other on all sides, but preferably all arranged along a helical line. Each of these thread islands consists of at least two, possibly three helically parallel adjacent thread projections, enclosing at least one thread groove between them, which radially protrude inward beyond the inner surface of the lead casing tube.

A thread island is in any case defined as a location where multiple thread projections are formed, which cooperate with comparable thread projections formed at another location on the corresponding thread sleeve, with each thread island being completely spaced apart from all other thread islands on all sides.

Typically, these thread projections extend by less than 125°, preferably by less than 95°, ideally by less than 65° in the circumferential direction of the lead casing tube. The thread islands are designed and arranged so that the outer thread of the lead holder always engages with at least one thread island, regardless of the position of the lead holder along its intended displacement path.

Due to the limited, namely only a few, purely local thread engagements between the injection mold or its core and the lead casing tube sprayed onto it, it is possible to remove the lead casing tube from the mold core with the outer thread by simply utilizing the elasticity of the still warm, freshly injected plastic. With proper design, it can be pushed out, meaning the freshly injection-molded lead casing tube can be easily linearly withdrawn or pushed out from its mold core.

It should be noted that the correct dimensioning of the thread projections is crucial. The thread projections are usually designed with a shallower than usual flank angle, typically less than or equal to 45°. This reduces the force that the mold core can exert during removal before the lead casing tube expands radially enough to allow the mold core to slip out. In some cases, the thread projections are rounded or additionally rounded, preferably as known to those skilled in the art, so-called rounded thread or sliding thread.

It should also be noted that the thread projections should have sufficient width to be resilient enough and not to break or shear off in the area of the thread base. Typically, their width is at least two or even 2.5 times greater than the width of the thread groove or depression formed between two such thread projections. This ensures that the thread projections of the lead casing tube are sufficiently resistant to shearing.

Typically, the radially outermost end of the thread projections is not pointed but flattened, therefore forming a plane. This also contributes to the shear strength extending into the tip area.

Further design options, functionalities, and advantages arise from the subclaims as well as the exemplary embodiment and also the to-scale enlarged drawings.

BRIEF DESCRIPTION OF THE DRAWINGS

FIG. 1 shows, in longitudinal section, a cartridge according to the invention, which can be screwed onto or inserted and locked onto a main part of a cosmetic applicator via its coupling 11*a*, similar to the lower part of a ballpoint pen.

FIG. 2 shows the cartridge 5 of FIG. 1 with the lead casing tube depicted transparently.

FIG. 3 shows a longitudinal section of the lead casing tube.

FIG. 4 shows the lead guiding tube 21.

FIG. 5 shows the precise, inventive structure of the lead base consisting of the inner and outer tubular bodies 24, 25, which are only in contact via the bridge 26 and otherwise float apart from each other.

DETAILED DESCRIPTION OF THE INVENTION

The exemplary embodiment depicted in FIGS. 1 to 5 embodies a cartridge for a refillable eyeliner, the main applicator part of which is not shown here.

It can be clearly seen from FIG. 1 that the cartridge 1 has a lead casing tube 15, which here forms, for example, the outermost covering of the cartridge 1, providing the surface that the user grips with their hands when using the cartridge 1 or the corresponding eyeliner.

In lead casing tube 15 is a lead guiding tube 21 arranged in a sliding and rotatable manner, but fixed in the direction of the longitudinal axis 19, avoiding translational movement capability. The first sliding bearing G1 of the lead casing tube 15 is arranged in the area of the lead tip behind the exit opening of the lead. The lead casing tube 15 forms an annular shoulder here, into which the front end of the lead guiding tube 21 is inserted and then held in a sliding and rotating manner. The second sliding bearing G2 of the lead casing tube forms the cylindrical or bell-shaped flexible skirt 27, which here overlaps the coupling half 11*a* to be explained in more detail and is spread into a circular counter bearing surface on the inner circumferential surface of the lead casing tube 15, sealingly.

It is clearly visible that the lead guiding tube 21 has a predominantly straight longitudinal slot 22 along its length. The lead guiding tube 21 is provided on its side facing away from the application tip with the coupling half 11*a*, which is usually attached to it in one piece.

The slotted lead guiding tube 21 interacts with a specially designed lead base 23. The lead base 23 essentially consists of two coaxially arranged but predominantly radially spaced tube bodies 24 and 25. The outer tube body 25 has the shape of a cylindrical sleeve with an outer thread and forms a thread section. It is connected to the actual lead holder, i.e., the inner tube body 24, only via a longitudinal bridge 26. In this way, there is a C-shaped clearance between the actual lead holder and its thread section, which is penetrated by the slotted lead guiding tube 21 in the assembled state. This can be seen in FIG. 1 compared to FIG. 5.

Once this is understood, one can see how the feed mechanism works.

Once the cartridge is mounted on the applicator main part, a rotational movement can be imparted to it from the applicator main part via its coupling half on the way through its own coupling half 11*a*. This causes the lead guiding tube 21 to rotate relative to the lead casing tube 15. In this way, the lead base 23 as a whole also rotates, along with the lead.

As its exterior engages with the inner thread, which forms the first thread island Gi1 of the lead casing tube (FIG. 3), the lead base 23 screws forward, pushing the lead 16, which is anchored with it, forward. Even before the lead base 23 completely disengages with its outer thread from the first thread island Gi1, it reaches the second thread island Gi2 and soon screws only along this one. The process repeats with the other thread islands, including Gi3, Gi4, Gi5, Gi6, and Gi7.

It is clearly visible from FIGS. 2 and 3 that the thread islands, formed from the thread projections 28 running parallel to each other in a thread shape, are positioned to form at least three rows (then 3×120°), ideally four rows of at least three thread islands each, which—preferably either completely or substantially-form consecutive thread islands aligned in the direction of the longitudinal axis 19.

The invention claimed is:

1. A cosmetic applicator or assembly part for a cosmetic applicator, comprising:

a thread spindle drive for moving a lead consisting of cosmetic mass relative to a lead housing tube accommodating the lead, wherein a thread is formed on an inner peripheral surface of the lead housing tube, and the thread interacts with a complementary thread of a lead holder holding the lead indirectly or directly, and the thread moves the lead holder together with the lead relative to the lead housing tube translationally when the lead holder is rotated relative to the lead housing tube, wherein said thread of the lead housing tube is not a continuous thread, but consists of a plurality of thread islands that are spaced apart from each other, each of the plurality of thread islands having thread projections extending by less than 121° in a circumferential direction and being shaped and arranged such that an outer thread of the lead holder always engages with at least one of the plurality of thread islands, the each of the plurality of thread islands consisting of at least two helically parallel adjacent thread projections which radially protrude inward beyond an inner surface of the lead housing tube.

2. The cosmetic applicator or assembly component for a cosmetic applicator according to claim 1, wherein the lead holder with the lead slides in a lead guide tube which is rotatable and predominantly spaced from the lead holder in the lead housing tube, wherein the lead guide tube is predominantly slotted and the lead holder is connected to a complementary thread section of the lead guide tube forming a slot.

3. The cosmetic applicator or assembly component for a cosmetic applicator according to claim 1, wherein a thread section of the lead holder is a cylindrical sleeve closed in the circumferential direction, which is only connected to an inner tube body of the lead holder via a longitudinal bridge, so that there is a C-shaped clearance between the inner tube body of the lead holder and the thread section, which is penetrated by the slotted lead guide tube.

4. The cosmetic applicator or assembly component for a cosmetic applicator according to claim 1, wherein the lead guide tube forms a coupling half at one end face, which is configured to be connected to another coupling half of a main part or parts of the cosmetic applicator or assembly component to transmit a feeding-inducing rotary motion through the main part or parts of the cosmetic applicator or assembly component.

5. The cosmetic applicator or assembly component for a cosmetic applicator according to claim 1, wherein the lead guide tube is rotatably mounted on the lead housing tube at two spaced-apart bearing locations, with a first bearing location in a region of a coupling half and a second bearing location in a region of a tapered tip with an outlet opening of the lead housing tube for the lead, which in a region behind the outlet opening forms a corresponding bearing shoulder on an inner peripheral surface of the outlet opening of the lead housing tube for the lead guide tube.

6. The cosmetic applicator or assembly component for a cosmetic applicator according to claim 5, wherein the first bearing in the region of the coupling half is achieved by a cylindrical flexible skirt, which partially extends over the coupling half and which expands sealingly into a circular counter bearing surface on the inner peripheral surface of the lead housing tube.

7. The cosmetic applicator or assembly component according to claim 1, wherein the assembly component is a cartridge.

8. The cosmetic applicator or assembly component according to claim 1, wherein the lead housing tube entirely or partially accommodates the lead.

9. The cosmetic applicator or assembly component according to claim 1, wherein each of the plurality of thread islands is spaced apart from each other by more than one thread groove.

* * * * *